US008302993B2

(12) United States Patent
Wang et al.

(10) Patent No.: US 8,302,993 B2
(45) Date of Patent: Nov. 6, 2012

(54) SUPPORT DEVICE FOR WALKING MACHINES

(75) Inventors: Youyi Wang, Hunan (CN); Yukun Zhao, Hunan (CN); Shihui Xie, Hunan (CN)

(73) Assignee: Sany Heavy Industry Co., Ltd., Changsha (CN)

( * ) Notice: Subject to any disclaimer, the term of this patent is extended or adjusted under 35 U.S.C. 154(b) by 252 days.

(21) Appl. No.: 12/679,383

(22) PCT Filed: Dec. 17, 2007

(86) PCT No.: PCT/CN2007/003630
§ 371 (c)(1), (2), (4) Date: Sep. 16, 2010

(87) PCT Pub. No.: WO2009/036627
PCT Pub. Date: Mar. 26, 2009

(65) Prior Publication Data

US 2011/0001309 A1 Jan. 6, 2011

(30) Foreign Application Priority Data

Sep. 21, 2007 (CN) ............................ 200710162427

(51) Int. Cl.
*B60S 9/02* (2006.01)

(52) U.S. Cl. ................... 280/766.1; 280/763.1; 212/302

(58) Field of Classification Search .................. 280/762, 280/763.1, 764.1, 765.1, 766.1; 212/301, 212/302, 306
See application file for complete search history.

(56) References Cited

U.S. PATENT DOCUMENTS

| | | | | |
|---|---|---|---|---|
| 6,138,845 | A * | 10/2000 | Kaspar | 212/302 |
| 6,799,778 | B2 * | 10/2004 | Heckmann | 280/763.1 |
| 6,811,161 | B1 * | 11/2004 | Anderson | 280/4 |
| 6,840,540 | B2 | 1/2005 | Fugel | |
| 2004/0197181 | A1 * | 10/2004 | Clark | 414/729 |
| 2006/0043718 | A1 * | 3/2006 | Mayer | 280/763.1 |

FOREIGN PATENT DOCUMENTS

| | | |
|---|---|---|
| CN | 1799908 | 7/2006 |
| DE | 31 24 029 | 3/1983 |
| DE | 42 03 820 | 8/1993 |
| DE | 20 2007 002 114 | 5/2007 |
| EP | 0 357 988 | 3/1990 |

OTHER PUBLICATIONS

International Search Report issued Jun. 26, 2008 in PCT/CN07/003630 filed Dec. 17, 2007.

* cited by examiner

*Primary Examiner* — John Walters
(74) *Attorney, Agent, or Firm* — Oblon, Spivak, McClelland, Maier & Neustadt, L.L.P.

(57) ABSTRACT

A support device for use in a walking machine including a frame-like base connected to a chassis, sheath tubes fixed on the frame-like base, extensible arms provided in the sheath tubes, support parts provided on outward ends of the extensible arms and extensible perpendicularly, wherein, the sheath tubes are arranged in double X-form, one pair of sheathe tubes arranged diagonally are parallel and at same height, another pair of the sheath tubes that are arranged diagonally and are also parallel and at a same height are at a different height from the pair of the sheath tubes.

7 Claims, 3 Drawing Sheets

SUPPORT DEVICE FOR WALKING MACHINES

TECHNICAL FIELD

The present invention relates to a support device for walking machines and a concrete pump vehicle having such a support device.

BACKGROUND ART

There are three manners in which support struts for a walking machine, in particular for a concrete pump vehicle work, in a first of which front struts are extensible with one crossing the other, and rear struts swing rearward or in a H-form; in a second of which both front and rear struts swing rearward to be retracted back; and in a third of which, front struts swing forward to be retracted back and rear struts swing rearward to be retracted back. All these support struts are pivotable or extensible with respect to an axis of a chassis, and have a vertical supporting cylinder at an end of the strut so as to allow the walking machine to obtain a stable working condition in operation.

Both EP0357988 and DE3124029 disclose a motorized concrete pump vehicle having crossed extensible front struts, in which the concrete pump vehicle is provided with a frame with two or more axles, the frame being provided with a material distributing rod rotatable about a vertical axle, the material distributing rod being mounted on a rod seat close to a front axle, and two forward-facing extensible struts arranged diagonally with one crossing the other, the two extensible struts arranged with one crossing the other being at different heights, the front struts and extensible tubes being arranged on a holding seat fixedly attached to the rod seat. EP0357988 discloses a pump vehicle provided with two extensible rear struts in a rear end region of the extensible tubes of the front struts, said rear struts being mounted such that they are rotatable around a vertical axle, they rotate rearward from a driving position thereof in parallel with the frame and enter their positions arranged rearward outward and diagonally. DE3124029 discloses a pump vehicle provided with H-form rear struts in a rear end region of the extensible tubes of the front struts, sheaths of said rear struts being mounted parallel to a wheel axle of a chassis, the rear struts being extensible along their sheaths.

DE4203820 discloses a concrete support strut of a swinging type, in which the struts are attached to pins of a swivel base, with a swinging cylinder connected between the swivel base and the swinging struts. When the concrete pump vehicle pumps concrete to a casting point, the front struts revolve outward about the pins to a supportable position. When the pump vehicle is in a running status, the struts retract inward to the two sides of the pump vehicle. Such a device has the disadvantage of not allowing an operation on a narrow construction site due to its structural dimensions.

U.S. Pat. No. 6,840,540 discloses a forward swinging support strut for mobile working machines. The support strut has a strut body that can be pivoted around a vertical pivoting axis on a chassis, a telescopic part that is telescopically displaceable relative to the strut body, a double-acting hydraulic cylinder that extends through the strut body and the telescopic part, and a support part provided at the outboard end of the telescopic part, the extensible cylinder being connected at its respective ends to securing points in the area of opposing ends of the strut body and the telescopic part, and the vertical pivot axis being defined by divided bearings located on the strut body spaced axially a distance from the cylinder inboard securing point in the direction of the foot part, and so positioned that said vertical axis transects the axis of displacement of the hydraulic cylinder.

The technical solutions as disclosed in the above-mentioned patent documents contain technical problems as below.

For a walking vehicle with a swinging support strut, as the swinging strut requires a large space to be extended due to its structural dimensions, it cannot operate on a narrow construction site. And in an embodiment of EP0357988, as the axes of the front struts and the rear struts are connected with an angle, stresses coming from the material distributing rod and transferred via the rod seat should be applied to the rear struts along the entire length of the vehicle, which requires a great effort in the design of the vehicle frame, thereby raising the manufacturing cost of the product.

When taking a H-form rearward strut, as a length along which stresses coming from the material distributing rod are transferred via the rod seat and the vehicle frame to the rear struts is increased, it requires to enlarge a structure and to increase a weight of the vehicle frame so as to ensure that the vehicle frame has sufficient rigidity, thereby raising the design and manufacturing costs of the product.

When taking a forward swinging strut, as it requires that a hydraulic cylinder is mounted to each strut side to carry out the process of the struts pivoting around the pins, the structural design is more complicated and the cost is higher, and moreover, it requires relatively more time changing the strut from a retracted condition into a working condition, which reduces efficiency in operation.

Thus, an object of the present invention is to provide an improved extensible support device and a concrete pump vehicle using such a support device which overcomes the shortcomings existing with support devices in the prior art. The device according to the present invention, which has a simple structure, is extensible within a short time and can be used in operation on a narrow construction site. A support device used for a walking machine, such as a concrete pump vehicle, which has a more compact structure and makes full use of a space of the support device, allows the forces borne by the left and right struts to be more balanced so as to improve the stability of the entire vehicle in operation.

SUMMARY OF THE INVENTION

The present invention provides a support device for walking machines and a concrete pump vehicle using such a support device. Just as commonly known by a person skilled in the art, said concrete pump vehicle comprises a chassis, a rotating mechanism mounted to the chassis, a material distributing rod, a pumping means and a support device. The chassis comprises at least one rear axle. The material distributing rod is attached to the rotating mechanism, and extends for carrying out a pumping operation and is folded to be placed above the chassis in a non-working condition. The rotating mechanism, the material distributing rod, the pumping means and the support device are all mounted to the chassis with the pumping means located at a rear of the rotating mechanism.

Said support device for use in a concrete pump vehicle comprises a frame-like base connected to a chassis, sheath tubes fixed on the frame-like base, extensible arms provided in the sheath tubes, support parts provided on the outward ends of the extensible arms and extensible perpendicularly.

Wherein, the sheath tubes are arranged in double X-form. One pair of sheathe tubes arranged diagonally to each other are parallel and at same height, and are located above or below the other pair of the sheath tubes that are arranged diagonally to each other and are also parallel and at same height. As required, the paired parallel sheath tubes can be arranged with one close to the other or with a space therebetween.

Wherein each of the extensible arms provided in the sheath tubes comprises two or more multi-grade extensible arms that are insertable one by one.

When the concrete pump vehicle is in operation, four extensible arms are extensible simultaneously or respectively. When the strut extends to a position which allows the support device to be extended vertically, support parts at a front end of the strut moves vertically to a stable base plane to be locked, supporting points of the four protruding support parts form supporting points in a square-shape. When the pump vehicle finishes its operation, the four struts change from the extended condition to the retracted condition according to a reverse operation process.

EMBODIMENT OF CARRYING OUT THE INVENTION

Figure 1:
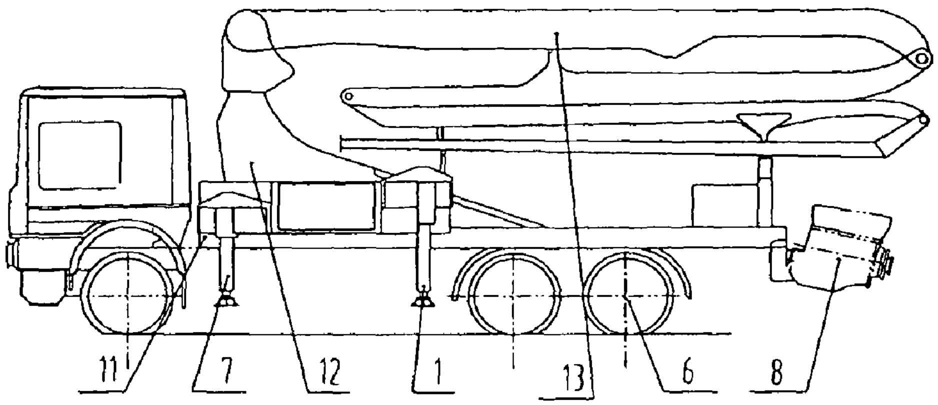
FIG. 1 is an illustrative view showing an entire structure of a support device according to the present invention.

As shown in FIG. 1, said concrete pump vehicle comprises a chassis 11, a rotating mechanism 12 mounted to the chassis, a material distributing rod 13, a pumping means 8 and a support device. The chassis 11 comprises at least one rear axle 6. The material distributing rod 13 is attached to the rotating mechanism 12, and extends for carrying out a pumping operation and is folded to be placed above the chassis 11 in a non-working condition. The rotating mechanism 12, the material distributing rod 13, the pumping means 8 and the support device are all mounted to the chassis with the pumping means 8 located at a rear of the rotating mechanism 12.

Figure 2:
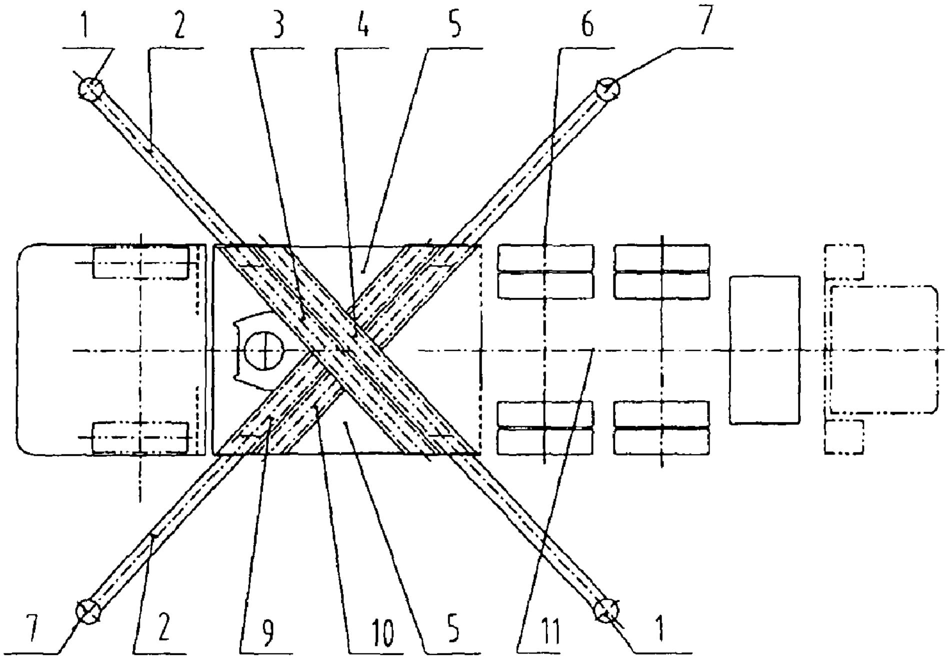
FIG. 2 is a top view showing an embodiment of the struts in double X-form according to the present invention.

As shown in FIG. 2, said support device for use in a walking machine is extensible and it comprises a frame-like base 5 connected to a chassis 11, sheath tubes 3, 4, 9, 10 fixed on the frame-like base, four extensible arms 2 provided in the sheath tubes, support parts 1, 7 provided on the outward ends of the extensible arms and extensible perpendicularly. In the embodiment, the frame-like base is in a rectangular shape, the sheath tubes 3 and 4, 9 and 10 are arranged in parallel and at same height with one close to the other, the sheath tubes 3, 4 are located above the sheath tubes 9, 10. As seen in a top view, the four sheath tubes are in double X-form. The support parts are all hydraulic cylinders, and lower ends of the support parts 1,7 are at the same horizontal level. The extensible arms 2 are arranged co-axially with the corresponding sheath tubes. When in operation, the four extensible arms 2 can be extensible horizontally inside said sheath tubes 3,4, 9, 10, and an extensible distance can be determined according to an actual construction site. After the extensible arms 2 have completed their extension, the support parts 1,7 at ends of the extensible arms 2 can protrude vertically to contact the ground so as to play the supporting function. In a running condition, said extensible arms 2 are retractable into the sheath tubes 3, 4, 9, 10.

Figure 3:
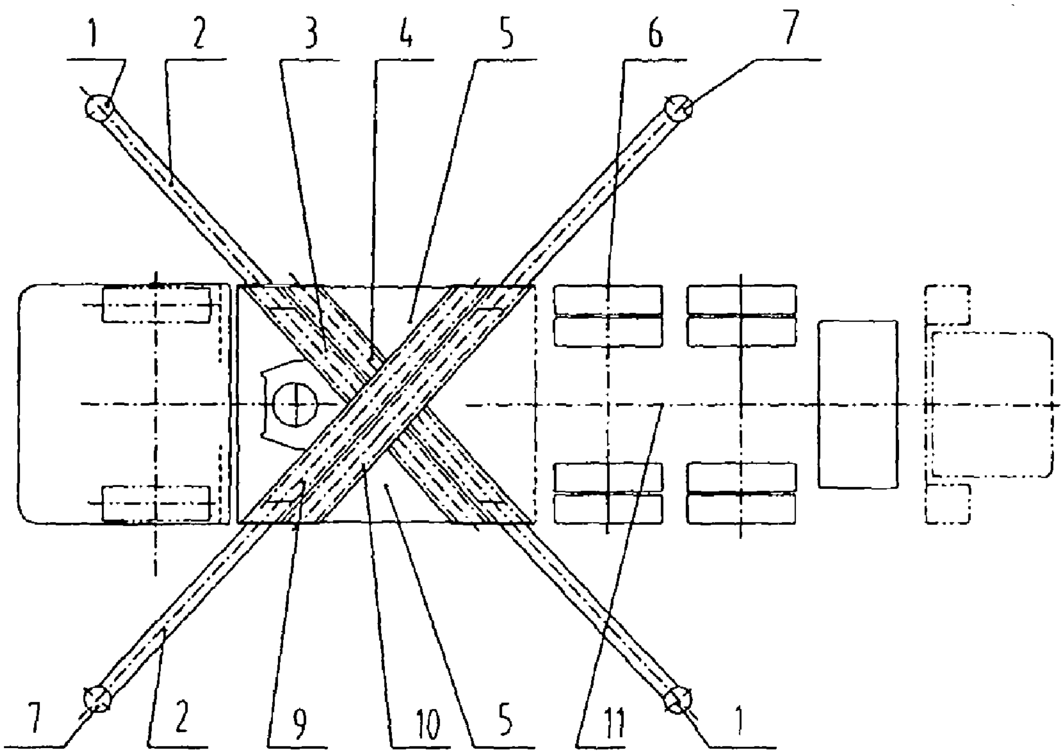
FIG. 3 is a top view showing another embodiment of the struts in double X-form according to the present invention.

FIG. 3 is a top view showing another embodiment of the struts in double X-form according to the present invention, in which, the sheath tubes 9, 10 are located above the sheath tubes 3, 4.

Figure 4:
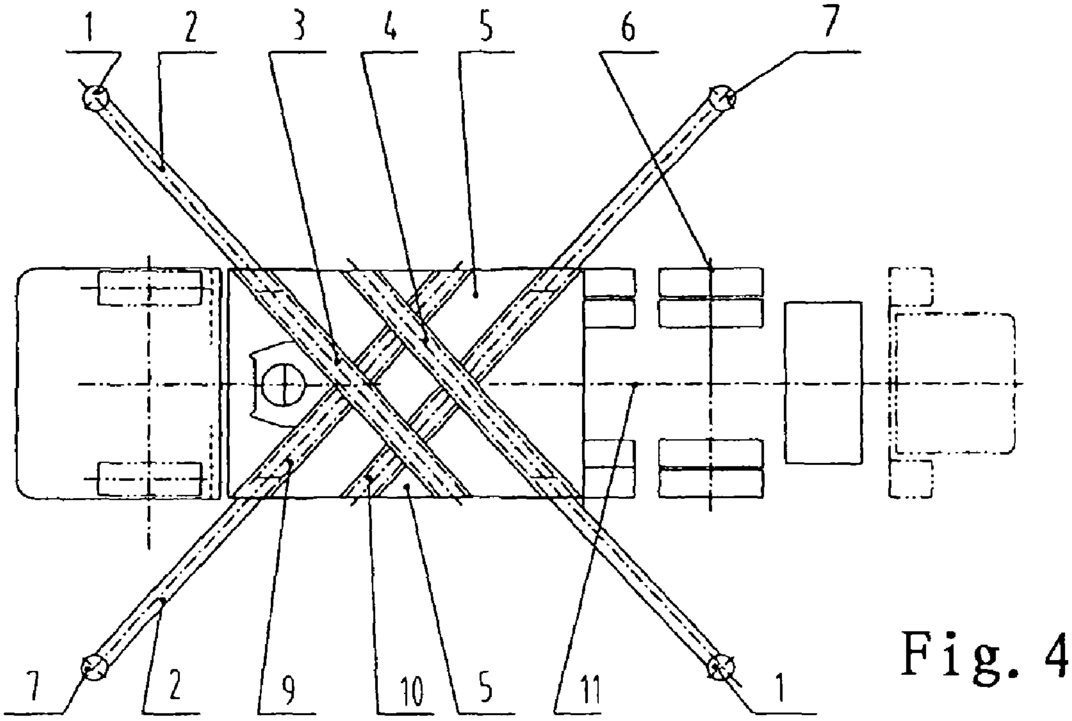
FIG. 4 is a top view showing a further embodiment of the struts in double X-form according to the present invention.

FIG. 4 is a top view showing a further embodiment of the struts in double X-form according to the present invention, in which, the sheath tubes 3, 4 are located above the sheath tubes 9, 10. Further, the parallel sheath tubes are spaced from one another for a distance or are close to one another as actually required. Furthermore, the case where the sheath tubes 9, 10 are located above the sheath tubes 3, 4 and the parallel sheath tubes are spaced from one another for a distance is not shown in the figures, but such a manner is also within the scope of the present invention.

Figure 5:
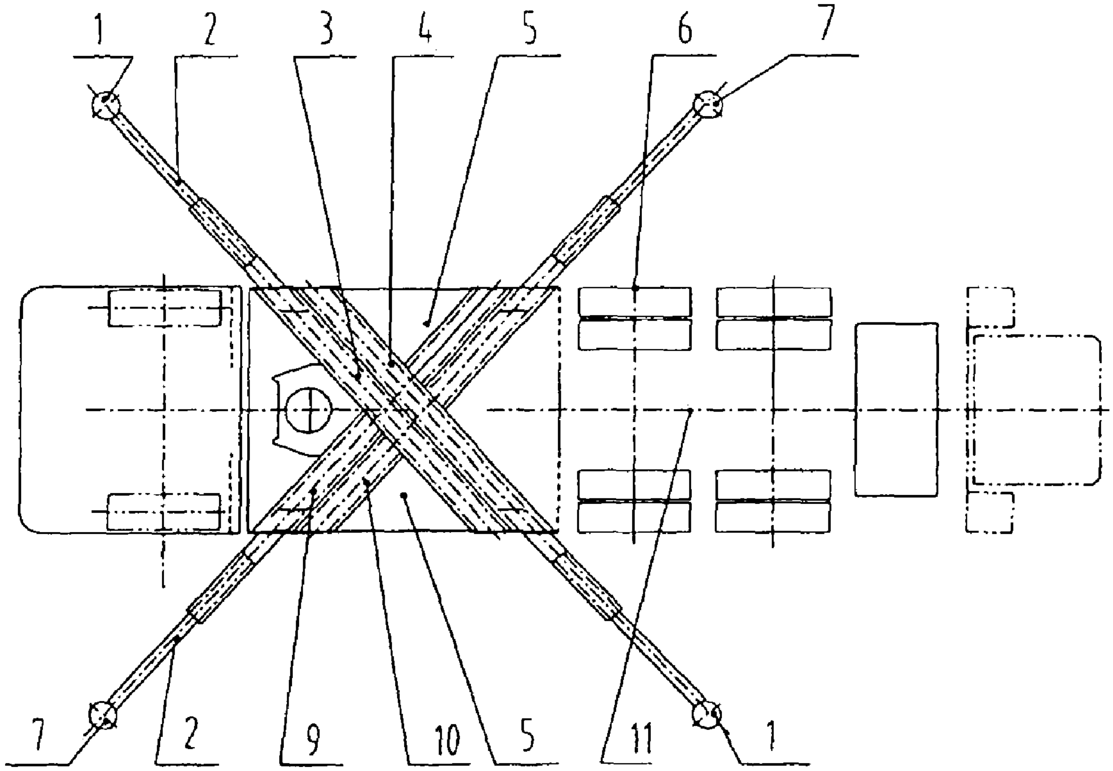
FIG. 5 is a top view showing an embodiment of the struts in double X-form according to the present invention as shown in FIG. 2, in which the extensible arms are multi-grade extensible arms.

FIG. 5 is a top view showing an embodiment of the struts in double X-form according to the present invention as shown in FIG. 2, in which the extensible arms 2 are multi-grade extensible arms, and the form of multi-grade extensible arms is also applicable to the manners as shown in FIGS. 3 and 4.

A double X-form strut according to the present invention eliminates the constraints that a swinging rearward strut cannot operate in a narrow construction site. By taking the operation manner in which four struts are extensible directly to change from a running condition to a working condition, the structural design is more simple, and a length along which stresses are transmitted to the rear struts is shorter, thereby reducing a weight of the vehicle frame and the cost. In addition, as supporting points of the four protruding support parts form supporting points in a square-shape, full consideration has been taken in the design concerning the specific positions for the centre of gravity of the vehicle and the struts. A relatively high stability is obtained with diagonal lines intersecting substantially at the centre of gravity of the concrete pump vehicle.

Although the present invention is illustrated and described in detail with reference to the embodiments, however, it should be understood by a person skilled in the art that the present invention can have various variations or modification without deviating from the spirit and scope of the present invention.

What is claimed is:

1. A support device for use in a walking machine comprising:

a frame-like base connected to a chassis;

sheath tubes fixed on the frame-like base;

extensible arms provided in the sheath tubes;

support parts provided on outward ends of the extensible arms and extensible perpendicularly, wherein the sheath tubes are arranged in double X-form, a first pair of sheath tubes arranged diagonally are parallel and at a same height, a second pair of the sheath tubes that are arranged diagonally and are also parallel and at a same height are at a different height from the first pair of the sheath tubes.

2. The support device according to claim 1, wherein the parallel sheath tubes that are arranged diagonally are close to one another.

3. The support device according to claim 2, wherein each of the extensible arms provided in the sheath tubes comprises two or more multi-grade extensible arms that are insertable one by one.

4. The support device according to claim 1, wherein the parallel sheath tubes that are arranged diagonally are spaced from one another for a distance.

5. The support device according to claim 4, wherein each of the extensible arms provided in the sheath tubes comprises two or more multi-grade extensible arms that are insertable one by one.

6. The support device according to claim 1, wherein each of the extensible arms provided in the sheath tubes comprises two or more multi-grade extensible arms that are insertable one by one.

7. A concrete pump vehicle, comprising:

a chassis;

a rotating mechanism mounted to the chassis;

a material distributing rod;

a pumping means; and a support device according to claim 6, wherein the chassis comprises at least one rear axle, the material distributing rod is attached to the rotating mechanism, the rotating mechanism, and the material distributing rod, the pumping means, and the support device are all mounted to the chassis with the pumping means located at a rear of the rotating mechanism.

* * * * *